June 23, 1953  H. H. KUGEL  2,643,072
FILM SPOOL AND MOLD FOR MAKING THE SAME
Filed May 31, 1946  2 Sheets-Sheet 1
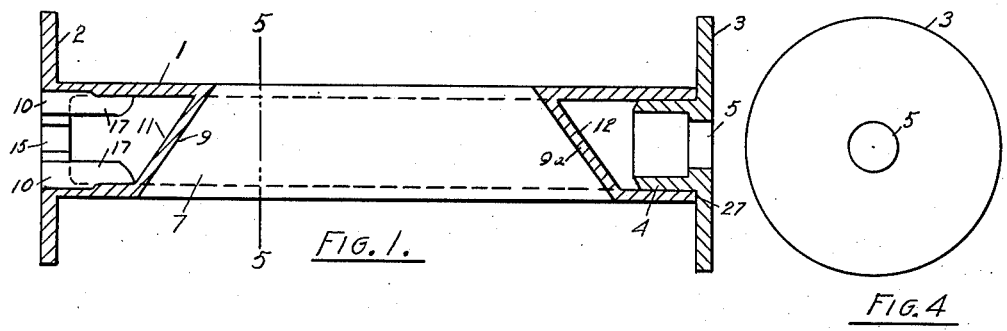
Fig. 1.  Fig. 4.
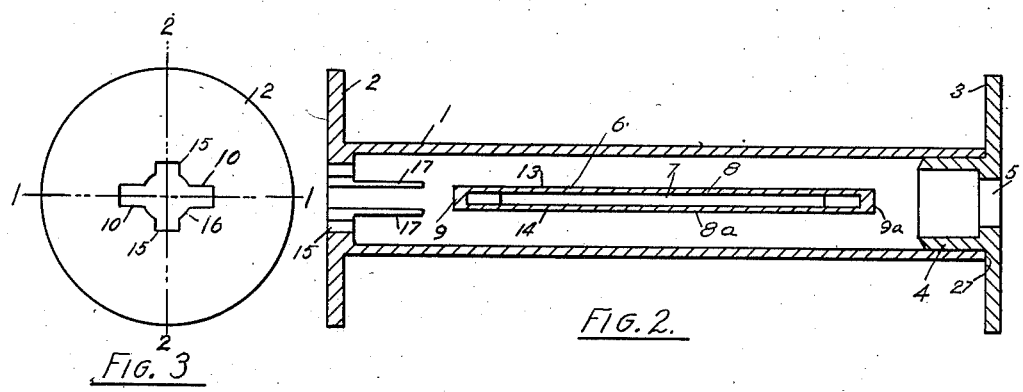
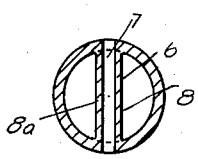
Fig. 3  Fig. 2.
Fig. 5.
Inventor
Harry H. Kugel
By Ralph Hammer
Attorney

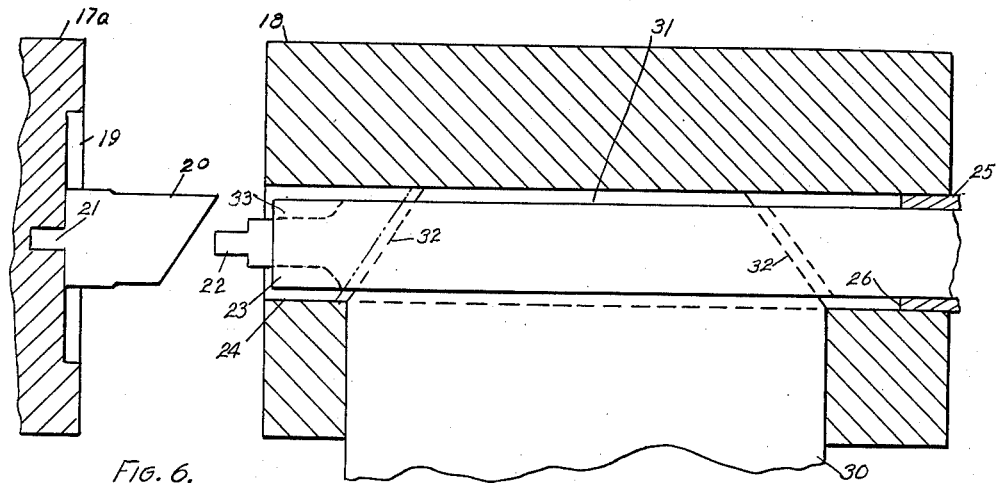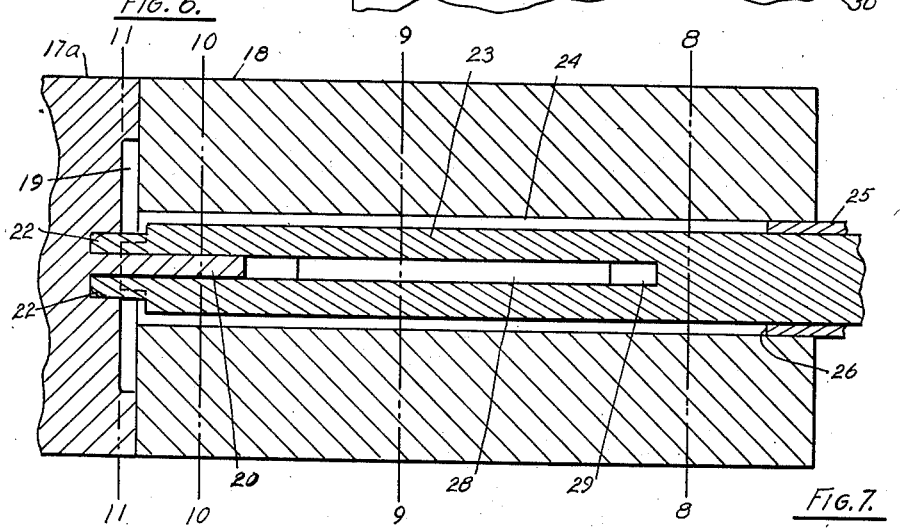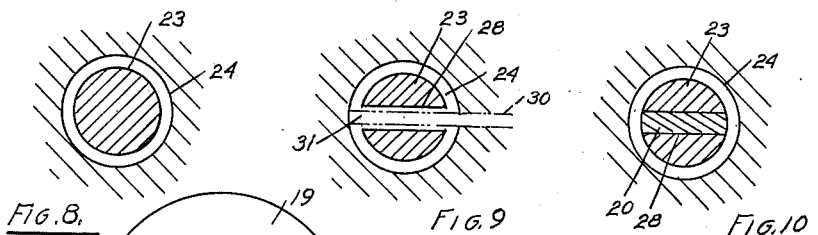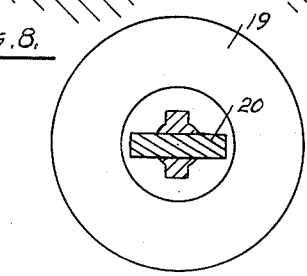

Patented June 23, 1953

2,643,072

UNITED STATES PATENT OFFICE 2,643,072

FILM SPOOL AND MOLD FOR MAKING THE SAME

Harry H. Kugel, Erie, Pa., assignor to National Organ Supply Company, Erie, Pa., a corporation of Pennsylvania Application May 31, 1946, Serial No. 673,384

4 Claims. (Cl. 242—71)

This invention is intended to provide a plastic film spool which can be molded to close tolerances. One feature is the molding of the film slot in an integral cross web within a hollow cylindrical arbor. Another feature is in the the turning lug flange where core index openings on opposite sides of the turning lug slot positively anchor both sides of the slotted core forming the inner surface of the arbor. Further objects and advantages appear in the specification and claims.

In the drawings, Fig. 1 shows a film spool in section in the plane of the film slot; Fig. 2 is a top plan view; Fig. 3 is an end view of the turning lug flange; Fig. 4 is an end view of the flange at the opposite end of the spool; Fig. 5 is a section on line 5—5 of Fig. 1; Fig. 6 is a view of the mold for making the arbor and turning lug flange in section along the plane of the film slot; Fig. 7 is a view of the mold in section at right angles to the film slot; and Figs. 8, 9, 10 and 11 are sections on lines 8—8, 9—9, 10—10, and 11—11 of Fig. 7.

Referring to the drawings, 1 indicates a hollow cylindrical arbor having at one end an integral turning lug flange 2 and at the other end a flange 3 having a cylindrical projection 4 cemented within the hollow end of the arbor and having at its center a spindle opening 5. Extending across the center of the arbor is a web 6 having a tapered film slot 7 extending completely through the arbor.

As indicated in Figs. 1, 2 and 5, the film slot is defined by side walls 8 and 8a and end walls 9 and 9a of thickness camparable with the wall thickness of the arbor. Because the arbor and the cross web are composed of thin wall sections, the spool is adapted to molding from plastics. The thin wall sections permit a fast molding cycle and avoid objectionable shrinking or warping. In line with the cross web 6 is a turning lug slot 10 of width and thickness equal to the width and thickness of the cross web. Because of this construction the core forming the turning lug slot 10 can also form the outer end surface 11 of the cross web. The outer end wall surface 12 and side wall surfaces 13 and 14 of the cross web 6 are formed by a slot in a cylindrical core extending into the open end of the arbor. On each side of the turning lug slots are index notches 15 aligned to form a cross slot in the turning lug flange sufficiently shorter than the turning lug slot so as to prevent use of the cross slot for turning the film spool. The notches 15 serve to index and locate the ends of the cylindrical core. The positive location of the ends of the core is necessary due to the length of the core and the pressure of the molding material around the core and within the slot which would tend to displace the slotted end of the core and prevent removal from the mold. The notches 15 are joined to the sides of the turning lug slot 10 by arcuate surfaces 16 concentric with the arbor. On each side of the turning lug slot are reenforcing flanges 17 extending from the inner surface of the turning lug flange to the inner surface of the arbor in substantially direct continuation with the edges of the turning lug slot. These flanges may be formed by recesses in the cylindrical core straddling the core forming the turning lug slot.

The spool may be made in two pieces, one comprising the hollow cylindrical arbor and turning lug flange and the other comprising the spindle flange at the opposite end of the arbor. Both of these pieces may be molded in molds parted in the plane of the flanges so that all of the surfaces coming in contact with the film will be smooth. Both pieces have a thin and substantially uniform wall section so that shrinkage and warping is avoided.

The mold for making the hollow arbor and integral turning lug flange comprises mating parts 17a and 18. The mold part 17a has a cavity 19 forming the outer surface of the turning lug flange, a core 20 forming the turning lug slot 10 and the end wall 11 of the cross web 6, and index notches 21 for tangs 22 on the end of a cylindrical core 23. The mold part 18 has a cylindrical cavity 24 forming the outer surface of the arbor 1 of the spool. Slidably fitting in the bottom of the cavity 24 is a tubular ejector sleeve 25 having an end surface 26 forming the end surface 27 of the arbor. The inner surface of the ejector sleeve 25 slides on the core 23 which is suitably anchored in the mold part 18. The core 23 has an axially extending slot 28, the sides of which form the surfaces 13 and 14 of the cross web 6 and the inner end 29 of which forms the end surface 12 of the cross web. The film slot 7 in the cross web is formed by a retractable core 30 having an inner end 31 extending completely across the cavity 24 midway between the sides of the slot 28. The end 31 has tapered edges 32 forming the sides of the tapered film slot 7. At 33 the surfaces of the core 23 adjacent the core 20 are provided with recesses forming the flanges 17.

In the molding operation the mold parts 17a and 18 are closed and the core 30 is extended so that its inner end 31 extends completely across the cavity 24 midway between the sides of the slot 28. The plastic material is then injected into the mold. At the end of the molding cycle the mold parts 17a and 18 are separated as indicated in Fig. 6, and the core 30 is retracted so that its inner end 31 is clear of the cavity 24. At this point the ejector sleeve 26 is moved forward within the cavity so as to eject the piece from the mold.

What I claim as new is:

1. A film spool having a hollow cylindrical arbor with an integral turning lug flange at one end, a turning lug slot in the flange, an integral web within and extending across the arbor and axially in line with the slot, a shorter cross slot at the center of the turning lug slot, and ribs within and extending inward from the inner surface of the arbor and extending axially along the arbor to the turning lug flange in substantially direct continuation of the sides of the turning lug slot.

2. A mold comprising a cylindrical core, an ejector sleeve having a sliding fit on one end of the core, an axially extending slot in the other end of the core, a mold part having a cylindrical cavity slidably receiving the ejector sleeve, a mating mold part carrying a core extending part way into the slot, tongues on the cylindrical core on each side of the slot indexed into the mating mold part, and a flange forming cavity in said mold parts extending over part of said other end of the core.

3. A molded or cast film spool having a hollow cylindrical arbor with an integral turning lug flange at one end, a turning lug slot in the flange, core anchoring openings in the flange on each side of the slot and defining a shorter cross slot, an integral web within and extending across the arbor and axially in line with the slot, and a film slot in the web.

4. A mold comprising a cylindrical core, an ejector sleeve having a sliding fit on one end of the core, an axially extending slot in the other end of the core, a mold part having a cylindrical cavity slidably receiving the ejector sleeve, a mating mold part carrying a core extending part way into the slot, tongues on the cylindrical core on each side of the slot indexed into the mating mold part, a retractable core extending across the cylindrical cavity between the sides of the slot, and a flange forming cavity in said mold parts extending over part of said other end of the core.

HARRY H. KUGEL.

References Cited in the file of this patent

UNITED STATES PATENTS

| Number | Name | Date |
| --- | --- | --- |
| 2,005,405 | Wittel | June 18, 1935 |
| 2,110,028 | Schwarz | Mar. 1, 1938 |
| 2,277,599 | McGinnis | Mar. 24, 1942 |
| 2,396,406 | Anderson | Mar. 12, 1946 |
| 2,400,024 | Roehrl | May 7, 1946 |
| 2,487,359 | Natzler | Nov. 8, 1949 |

FOREIGN PATENTS

| Number | Country | Date |
| --- | --- | --- |
| 473,830 | Great Britain | Oct. 20, 1937 |
| 43,131 | Mexico | July 19, 1944 |